US012606143B2

(12) United States Patent
Adamski et al.

(10) Patent No.: US 12,606,143 B2
(45) Date of Patent: Apr. 21, 2026

(54) BRAKE SIGNAL TRANSMITTER, BRAKING SYSTEM, AND VEHICLE

(71) Applicant: ZF CV Systems Global GmbH, Bern (CH)

(72) Inventors: Krzysztof Adamski, Wroclaw (PL); Marcin Keska, Wroclaw (PL); Kamil Miksa, Wroclaw (PL)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 18/650,494

(22) Filed: Apr. 30, 2024

(65) Prior Publication Data

US 2024/0367632 A1     Nov. 7, 2024

(30) Foreign Application Priority Data

May 2, 2023     (EP) ..................................... 23171078

(51) Int. Cl.
| | |
|---|---|
| *B60T 17/00* | (2006.01) |
| *B60T 11/16* | (2006.01) |
| *F15B 15/00* | (2006.01) |
| *F15B 21/00* | (2006.01) |
| *F15B 21/041* | (2019.01) |

(52) U.S. Cl.
CPC ............. *B60T 17/004* (2013.01); *B60T 11/16* (2013.01); *F15B 15/00* (2013.01); *F15B 21/005* (2013.01); *F15B 21/041* (2013.01); *Y10T 137/3102* (2015.04); *Y10T 137/794* (2015.04)

(58) Field of Classification Search
USPC ..... 137/107, 203, 204, 212, 543.13, 543.17, 137/543.19, 547, 550, 598; 251/119, 251/127; 222/444, 445, 449; 312/229
See application file for complete search history.

(56) References Cited

U.S. PATENT DOCUMENTS

| | | | | |
|---|---|---|---|---|
| 1,805,658 A | * | 5/1931 | Farmer ................. | B60T 17/002 303/33 |
| 1,935,813 A | * | 11/1933 | Neveu .................... | B01D 46/10 137/550 |
| 2,197,092 A | * | 4/1940 | Campbell ............... | B60T 15/42 251/63.5 |

(Continued)

FOREIGN PATENT DOCUMENTS

| | | |
|---|---|---|
| EP | 0241673 A1 | 10/1987 |
| EP | 1000830 B1 | 7/2003 |

(Continued)

*Primary Examiner* — Matthew W Jellett
(74) *Attorney, Agent, or Firm* — Dickinson Wright PLLC

(57) ABSTRACT

A brake signal transmitter (10) includes a housing (11) and a liquid drainage system (20). The liquid drainage system (20) includes an opening in the housing (11) and a cover (30) that extends over or along the opening. The cover (30) includes at least one aperture that allows a liquid to be drained through the cover (30). The opening (21) of the housing (11) is arranged on a downward side of the housing (11) relative to a gravitational force the transmitter is mounted horizontally. The cover (30) may be a cap having a filter inserted therein. The filter may define a tortuous path to block ingress of water or debris into the housing. The cover may include resilient fingers that snap fit into a socket of the housing.

20 Claims, 5 Drawing Sheets

(56)                  References Cited

U.S. PATENT DOCUMENTS 2,572,311  A  *  10/1951  Burd ........................ F16T 1/14
                                                      55/494
2,859,763  A  *  11/1958  Fites .................... B60T 13/403
                                                      303/29
2,958,394  A  *  11/1960  Woodmansee ............ F16T 1/14
                                                      137/107
2,962,119  A  *  11/1960  White .................... B01D 46/10
                                                      55/432
3,748,837  A  *   7/1973  Billeter ................... B61G 5/08
                                                      251/315.1
3,817,267  A  *   6/1974  Hicks ..................... F16K 31/58
                                                      137/204
4,018,579  A  *   4/1977  Hofmann ............. A61C 1/0061
                                                      96/111
4,141,379  A  *   2/1979  Manske ............... F16K 15/144
                                                      137/859
4,586,535  A  *   5/1986  Stoll ...................... F16K 15/00
                                                      137/596.17
4,855,041  A      8/1989  Church et al.

5,600,953  A  *   2/1997  Oshita .................... F15B 21/041
                                                      60/456
5,947,239  A      9/1999  Koelzer
7,753,069  B2 *   7/2010  Nichols .................... F16T 1/34
                                                      137/204
9,010,365  B2 *   4/2015  Cella .................... B60T 17/222
                                                      60/453
9,259,681  B2 *   2/2016  Jenkins ............... B60T 17/004
10,583,391 B2 *   3/2020  Howe .................... B01D 53/28
11,603,942 B2     3/2023  Arteta Unanua et al.
2005/0167351 A1   8/2005  Herman et al.
2014/0209620 A1*  7/2014  Barna ..................... F16T 1/00
                                                      220/694
2015/0314761 A1  11/2015  Cadeddu
2020/0207324 A1*  7/2020  Tomchak ........... B01D 46/0045

FOREIGN PATENT DOCUMENTS

EP          3390175  B1      8/2019
GB          2304839  A       3/1997
GB          2371351  A       7/2022
PL           236795  B1      2/2021

* cited by examiner

BRAKE SIGNAL TRANSMITTER, BRAKING SYSTEM, AND VEHICLE

FIELD

The present disclosure relates to braking systems and components thereof. The present disclosure relates in particular to a brake signal transmitter configured for use in a commercial vehicle. The present disclosure also relates to a braking system having the brake signal transmitter and to a vehicle, in particular a commercial vehicle, having the brake signal transmitter or the braking system.

BACKGROUND

Commercial vehicles, such as towing vehicles, trucks, lorries or buses, are equipped with braking systems that address the specific challenges encountered in commercial vehicles.

Braking systems suitable for commercial vehicles may also include specific components such as brake signal transmitters adapted for the requirements of commercial vehicles. Examples of brake signal transmitters are disclosed in EP 3 390 175 B1, EP 1 000 830 B1, and EP 0 241 673 B2. Such brake signal transmitters may be operative to generate fluidic (e.g., pneumatic) and/or electric signals required for the control of the electro-pneumatic braking system.

Temporary presence of a liquid in a housing of a brake signal transmitter may be acceptable. However, it is desirable that the liquid can be drained from the housing. Some brake signal transmitters are designed in such a manner that they facilitate liquid drainage when the brake signal transmitter is mounted vertically, i.e., along the gravity direction, when a vehicle in which the brake signal transmitter is installed is on a horizontal surface. However, it would be desirable for a brake signal transmitter to provide liquid drainage for at least one mounting orientation other than vertical. It would also be desirable for a brake signal transmitter to provide liquid drainage while reducing the risk that dirt (such as particulate matter) and/or liquid (such as spray water) enters the housing of the brake signal transmitter.

SUMMARY

It is an object of the present disclosure to provide an improved brake signal transmitter. It is in particular an object of the present disclosure to provide a brake signal transmitter that provides a mechanism for liquid drainage while reducing or eliminating the risk of ingress of liquid or dirt into the housing. It is also optionally an object of the present disclosure to provide a brake signal transmitter that allows liquid to be drained from the housing of the brake signal transmitter without requiring the brake signal transmitter to be mounted such that its axis is aligned with the gravity direction when a vehicle having the brake signal transmitter is on a horizontal surface.

According to the present disclosure, a brake signal transmitter as described herein is provided. The disclosure includes various preferred or advantageous embodiments.

A brake signal transmitter according to the present disclosure includes a housing and a liquid drainage system. The liquid drainage system includes an opening in the housing. The liquid drainage system includes a cover configured to extend over or along the opening. The cover includes at least one aperture configured to allow a liquid to be drained through the cover.

The brake signal transmitter according to the present disclosure allows liquid to be drained from the housing. The liquid drainage system is specifically configured in such a manner that the risk of liquid (e.g., spray water) and/or dirt (i.e., particulate matter) entering the housing is mitigated. More particularly, the liquid drainage system includes the cover which allows liquid to pass from the housing through the opening and the aperture(s) of the cover. At the same time, the cover reduces the risk of unintentional ingress of liquid and/or dirt into the housing.

The cover may be mounted so as to substantially or fully overlap the opening. This configuration provides the effect that spray water or dirt impinging on the housing and the cover is unlikely to enter into the housing through the opening.

The cover may be made of a plastic material. This configuration provides the effect that the cover can be manufactured efficiently and has low weight.

The plastic material may be a polyamide, e.g., a glass fiber reinforced polyamide such as PA6-GF30. This configuration provides the effect that the cover can be manufactured efficiently and has low weight.

The cover may include an engagement structure configured for engagement with the housing. The engagement structure may include or may be made of the plastic material. This configuration provides the effect that a flange of the housing with which the engagement structure is engaged can be formed with lower wall thickness as compared to, e.g., a case in which the cover is crimped to the housing.

The engagement structure may include at least one resiliently deformable cover portion. The at least one resiliently deformable cover portion may be configured for a snap-fit engagement with the housing. This configuration provides the effect that the cover can be mounted in a simple and efficient manner by way of a snap-fit engagement.

The cover and the housing may be configured to be engaged by way of a press-fit connection or a push-in connection. This configuration provides the effect that the cover can be mounted in a simple and efficient manner.

The at least one aperture may have gaps on opposite sides of the at least one resiliently deformable cover portion (such as an arm biased into an engagement position). This configuration provides the effect that the at least one an aperture has the double functionality of delimiting the at least one resiliently deformable cover portion and allowing liquid to pass to the outside.

The housing may include a housing socket at the opening. The housing socket may have a flange that projects outwardly from a housing surface and a recessed portion recessed relative to the housing surface. The flange may include a cylindrical wall. This configuration provides the effect that secure mounting of the cover is facilitated. Forces caused by water jets, for example, are more likely to be absorbed by outer walls of the housing socket and are less likely to directly impinge onto the cover. The risk of inadvertent dislodgment of the cover is reduced.

The cover may be configured to be inserted into the housing socket. This configuration provides the effect that secure mounting of the cover is facilitated. Forces caused by water jets, for example, are more likely to be absorbed by outer walls of the housing socket and are less likely to directly impinge onto the cover. The risk of unintentional displacement or dislodgment of the cover is thereby reduced further.

The liquid drainage system may be configured to allow only a one-way flow through the liquid drainage system. Thus, a one-way valve functionality may be provided by the liquid drainage system. This configuration provides the effect that the risk of liquid and/or particulate matter ingress (such as dirt ingress) into the housing at the opening is reduced further.

The brake signal transmitter may include a foreign matter ingress-reducing arrangement configured to reduce or eliminate foreign matter ingress (e.g., liquid and/or particulate matter ingress) through the opening into the housing. This configuration provides the effect that the risk of liquid and/or particulate matter ingress into the housing at the opening is reduced further.

The foreign matter ingress-reducing arrangement may include a tortuous path, wherein the cover delimits at least a portion of the tortuous path. The tortuous path may extend from the opening in the housing to the aperture(s) in the cover. This configuration provides the effect that the cover, potentially in combination with other components such as an inner wall of the flange at the housing socket and/or a filter, defines a labyrinth-type seal that reduces the risk of foreign matter ingress through the opening.

The foreign matter ingress-reducing arrangement may include a filter. This configuration provides the effect that the risk of liquid or dirt ingress into the housing is reduced further.

The cover may include or may be a cap. The cap may include a skirt portion configured to receive at least a portion of the filter therein. This configuration provides the effect that secure mounting of the filter is facilitated. This has also the effect that the risk of foreign matter ingress (such as ingress of liquid and/or particulate matter) through the opening is reduced further by providing the filter within a skirt portion of the cap.

The cap may include an end face from which the skirt portion projects. The end face may be a continuous plate dimensioned to overlap most, optionally all, of the opening. This configuration provides the effect that the risk of liquid and/or particulate matter ingress through the opening is reduced further.

The foreign matter ingress-reducing arrangement may include a resiliently deformable bias member configured to bias the filter and the cap away from each other. The resiliently deformable bias member may be configured to be interposed between the filter and the cover (e.g., the cap). The resiliently deformable bias member may comprise a compression spring. This configuration provides the effect that the filter can be secured in abutment with an abutment surface of the housing. The risk of gap formation between the filter and the housing, which could give rise to a risk of liquid and/or particulate matter ingress through the opening, is reduced.

The filter may be integrally formed with the housing or the cover. This configuration provides the effect that assembly is simplified.

The filter may include a sintered body. The filter may include or may be a sintered body formed of spheres or ellipsoids of a metal or metal alloy material. The spheres or ellipsoids may be arranged in a closed-packed structure. This configuration provides the effect that liquid and/or particulate matter ingress into the housing can be reduced further by providing a labyrinth flow path through the filter.

The brake signal transmitter may be a unit configured to generate a pneumatic and/or electric signal indicative of an input. The input may be indicative of actuation of a brake pedal or of other braking actuation device that can be operated by a driver. This configuration provides the effect that the brake signal transmitter generates pneumatic and/or electric output as required for performing a braking operation in accordance with the input. The brake signal transmitter may be configured such that the input includes a mechanical input. This configuration provides the effect that the brake signal transmitter can act as a transducer that translates a mechanical input, such as a pathway of a brake pedal movement, into a corresponding pneumatic and/or electric output as required for performing a braking operation in accordance with the input.

The brake signal transmitter may include a main valve for a braking fluid, which may be a gaseous fluid or a braking liquid. This configuration provides the effect that the brake signal transmitter can generate a suitable fluidic pressure responsive to the input by actuation of the main valve.

The brake signal transmitter may include an actuating device configured to enable actuation of the brake signal transmitter by a driver of a vehicle. This configuration provides the effect that the actuation device, such as a brake pedal or a linkage connected to the brake pedal, can be provided as part of the brake signal transmitter. Mounting of the brake signal transmitter and actuation device is thereby facilitated.

The brake signal transmitter may include a pressure-producing device configured to generate a braking pressure in response to the actuation. This configuration provides the effect that the brake signal transmitter can be used for a fluidic braking system, such as a pneumatic or liquid-based braking system.

The pressure-producing device may be arranged in the housing. This configuration protects the pressure-producing device from foreign matter.

The housing may include a first axial housing end, a second axial housing end, and a circumferential housing wall extending between the first axial housing end and the second axial housing end. The opening may be provided in the circumferential housing wall. This configuration provides the effect that liquid drainage through the opening is possible when the brake signal transmitter is mounted horizontally, i.e., when the first and second axial housing ends are spaced from each other along the gravity direction.

The opening may be spaced from both the first axial housing end and the second axial housing end. This configuration provides the effect that liquid drainage is facilitated at an intermediate location between the first and second axial housing ends.

The circumferential housing wall may have an inner diameter. The inner diameter may vary in a direction from the first axial housing end to the second axial housing end. The opening may be provided in a portion of the circumferential housing wall where the inner diameter is maximum. This configuration provides the effect that gravity-driven liquid drainage is facilitated when the brake signal transmitter is mounted horizontally.

The housing may include a mounting structure for mounting the brake signal transmitter on a commercial vehicle. The opening in the housing may be arranged relative to the mounting structure such that liquid is driven through the opening by the gravitational force when mounting the brake signal transmitter to the commercial vehicle and the commercial vehicle is positioned on a horizontal surface. This configuration provides the effect of implementing a gravity-driven liquid drainage system.

The opening in the housing may be arranged on a downward portion of the housing relative to a gravitational force direction when mounting the brake signal transmitter to the commercial vehicle and the commercial vehicle is on a horizontal surface. This configuration provides the effect of implementing a gravity-driven liquid drainage system.

The mounting structure may be configured to allow the brake signal transmitter to be mounted such that an axis of the brake signal transmitter is transverse to a gravitational force direction, e.g., perpendicular to the gravitational force direction, when the commercial vehicle stands on a horizontal surface. The axis of the brake signal transmitter may be defined by or aligned with a center axis of a coil spring (such as a main coil spring of a brake signal transmitter main valve) of the brake signal transmitter. This configuration provides the effect that the brake signal transmitter is installable in a horizontal orientation while providing liquid drainage and reducing the risk of liquid and/or particulate matter ingress through the opening.

The mounting structure may be configured to allow the brake signal transmitter to be installed in a vertical orientation (with the axis of the brake signal transmitter being parallel to the gravitational force direction when the commercial vehicle stands on a horizontal surface) and in the horizontal orientation (with the axis of the brake signal transmitter being perpendicular to the gravitational force direction when the commercial vehicle stands on a horizontal surface).

A braking system according to an aspect of the disclosure includes the brake signal transmitter according to any embodiment disclosed herein. The braking system provides liquid drainage from the brake signal transmitter while reducing or eliminating the risk of liquid and/or dirt ingress into the housing through the opening.

The braking system may be an electronic braking system (EBS), without being limited thereto.

A vehicle according to an aspect of the disclosure may include the brake signal transmitter according to any embodiment or the braking system according to any embodiment. The braking system provides liquid drainage from the brake signal transmitter while reducing or eliminating the risk of liquid and/or dirt ingress into the housing through the opening.

The vehicle may be a commercial vehicle, such as a towing vehicle, a truck, a lorry, or a bus.

The vehicle is configured such that the opening of the housing is arranged on a downward side of the housing relative to a gravitational force direction when the vehicle is on a horizontal surface. This configuration provides the effect of implementing a gravity-driven liquid drainage system.

According to another embodiment, there is provided a method of assembling the brake signal transmitter of any embodiment, including assembling the cover at the opening of the housing. The method may further include mounting the brake signal transmitter on a vehicle such that the liquid drainage system is at a lower side, relative to a gravitational force, of the housing when the vehicle is on a horizontal surface.

According to another embodiment, there is provided a use of the brake signal transmitter of any embodiment mounted in a vehicle for providing liquid drainage from the housing of the brake signal transmitter and reducing liquid and/or particulate matter ingress into the housing.

Various effects and advantages are attained by embodiments of the present disclosure. Liquid drainage from the housing of the brake signal transmitter is provided while reducing the risk of liquid and/or dirt ingress into the housing through the opening of the liquid drainage system. The provision of a cover, such as a cap, having a plastic material (such as plastic engagement finger(s) for a snap-fit connection to the housing, or a cover engagement structure formed of a plastic material for a press-fit or push-in connection with the housing), provides ease of assembly, low weight, and reduces the requirements imposed on the structure of the housing with which the cover is engaged as compared to, e.g., an attachment of a metal cap by way of crimping.

BRIEF DESCRIPTION OF THE DRAWINGS

Further advantages and embodiments and developments are defined throughout the disclosure. These and other aspects of the present disclosure will be apparent from and elucidated with reference to the embodiments described hereafter with reference to the accompanying drawings, in which.

DETAILED DESCRIPTION

Figures 1, 2:
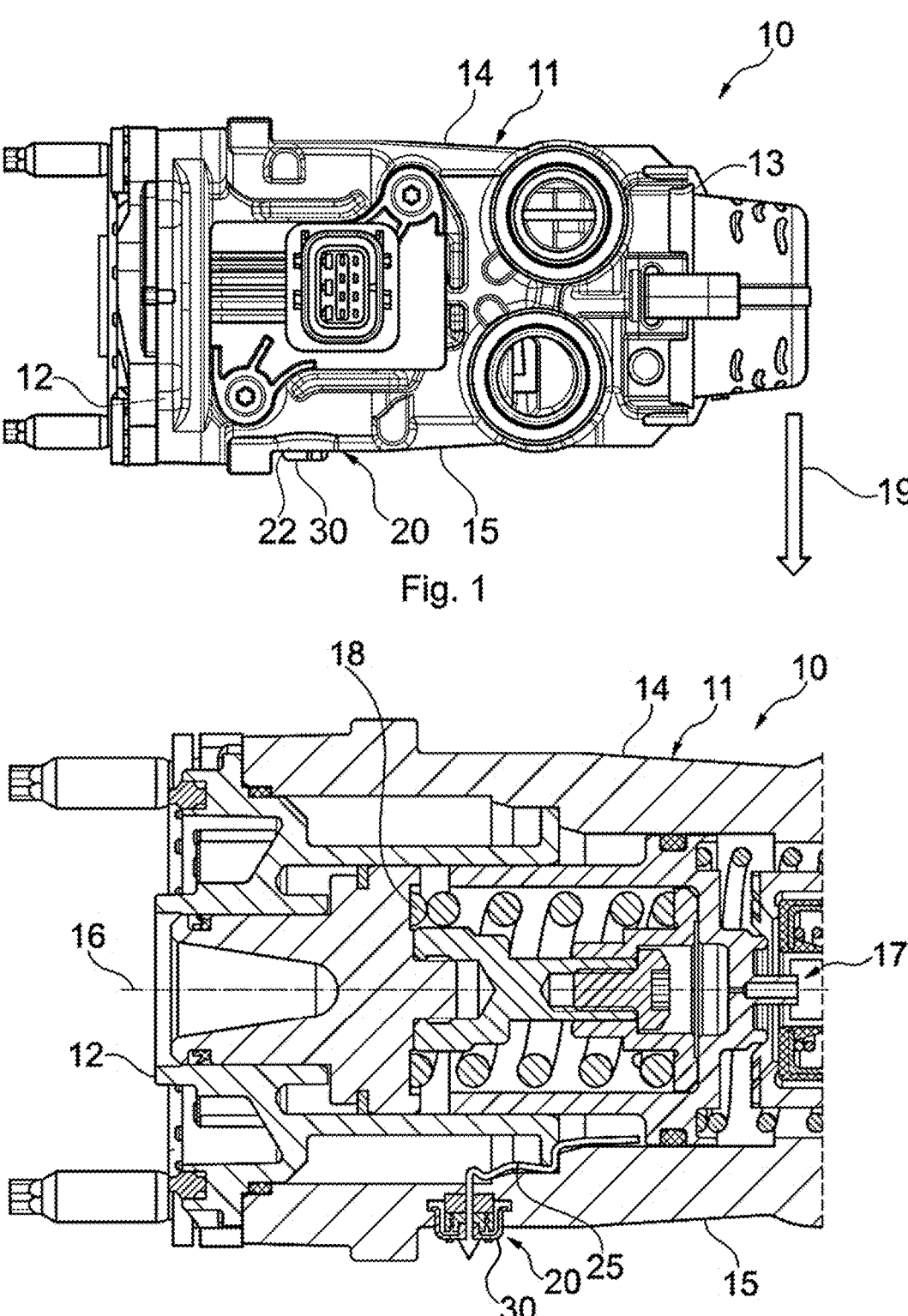
FIG. 1 is a plan view of a brake signal transmitter according to an embodiment of the present disclosure.
FIG. 2 is a cross-sectional view of the brake signal transmitter.

Embodiments of the present disclosure will be described with reference to the drawings. In the drawings, similar or identical reference signs designate elements with similar or identical configuration and/or function.

Embodiments of the present disclosure relate to a brake signal transmitter as well as a brake system and vehicle having the brake signal transmitter. As used herein, the term "brake signal transmitter" refers to a device configured to receive an input and provide an output indicative of a desired braking action. The output may be pneumatic, electric, or both, without being limited thereto. The input may be a mechanical input, which may be obtained from a brake pedal or a linkage connected to the brake pedal or another actuation device.

FIG. 1 is a plan view of a brake signal transmitter 10 according to an embodiment of the present disclosure. FIG. 2 is a cross-sectional view of the brake signal transmitter 10. The brake signal transmitter 10 includes a housing 11. The housing 11 includes a first axial housing end 12 and a second axial housing end 13. The housing 11 includes a circumferential housing wall 14. The circumferential housing wall 14 extends circumferentially around an axis 16 of the brake signal transmitter 10. The axis 16 may be an axis extending between a center of the first axial housing end 12 and a center of the second axial housing end 13. The axis 16 may be aligned with a center axis of a main coil spring 18 housed in the housing 11. A main valve 17 may be housed within the housing to provide pressure fluid (e.g., pressure gas) in response to an input received by the brake signal transmitter 10. Alternatively or additionally to providing a fluidic output, the brake signal transmitter 10 may be configured to provide an electric output signal.

When the brake signal transmitter 10 is mounted, a lower portion 15 of the circumferential housing wall 14 extends on the downward side of the housing 11. As used herein, the terms "lower side" or "downward" are provided with reference to a gravitational force direction 19 when a vehicle having the brake signal transmitter 10 is located on a horizontal surface.

The brake signal transmitter 10 includes a liquid drainage system 20. The liquid drainage system 20 may be a gravity-driven liquid drainage system. The liquid drainage system 20 is provided at the portion 15 of the housing 11 which, in a horizontal installation orientation of the brake signal transmitter 10, faces downward relative to the gravitational force direction 19. The liquid drainage system 20 is configured to provide a water flow path 25 that allows water or other liquids to be discharged from an interior of the housing 11, driven by gravitational force. The liquid drainage system 20 is also configured to reduce or eliminate ingress of liquid and dirt (such as dust or other particulate matter) into the interior of the housing 11. A cap 30 is engaged with a flange 22 of the housing 11 to secure the cap 30 overlapping with an opening (the opening being designated by reference numeral 21 in FIGS. 4 and 12) of the housing 11. The cap 30 includes one or several apertures to allow liquid to pass therethrough for liquid drainage from the housing 11. As will be explained in more detail below, the liquid drainage system 20 may be configured in such a way that it provides a one-way flow path for liquid to permit water egress while reducing or eliminating liquid and/or particulate matter ingress into the housing 11. The liquid drainage system 20 may include a labyrinth seal configuration to implement such a one-way valve functionality.

Figure 3:
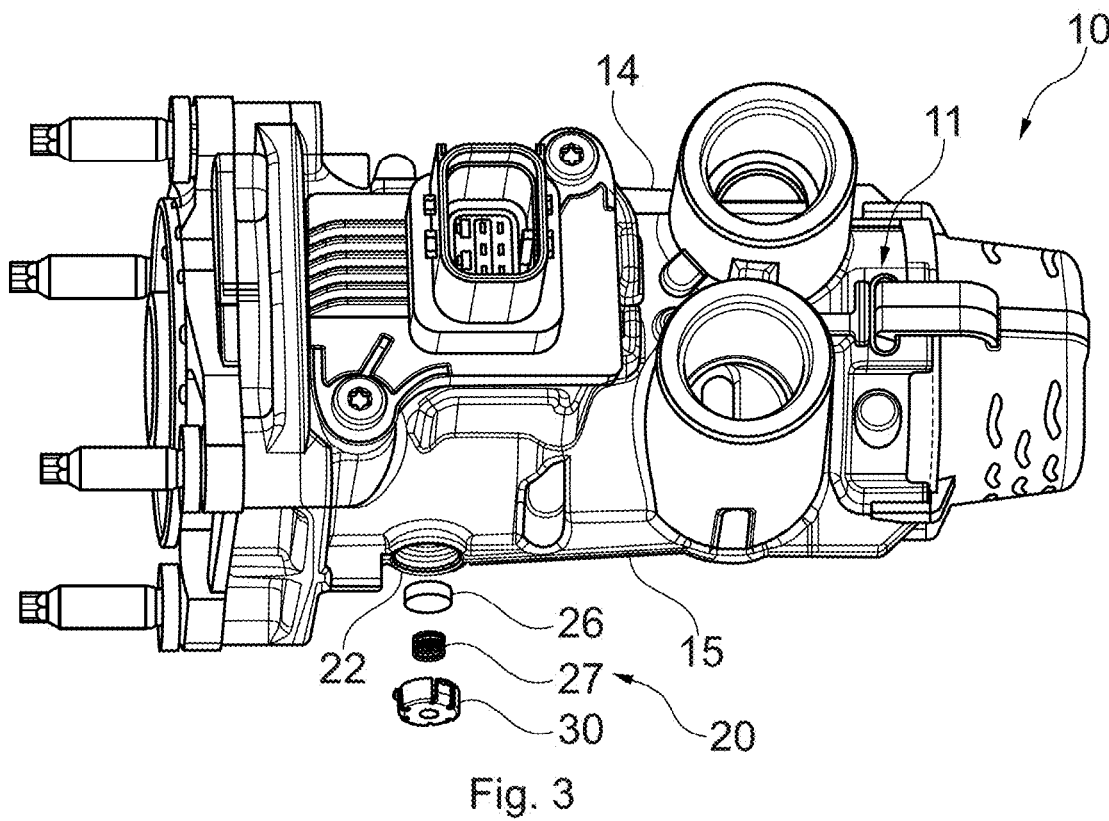
FIG. 3 is a partially exploded perspective view of the brake signal transmitter.
Figure 4:
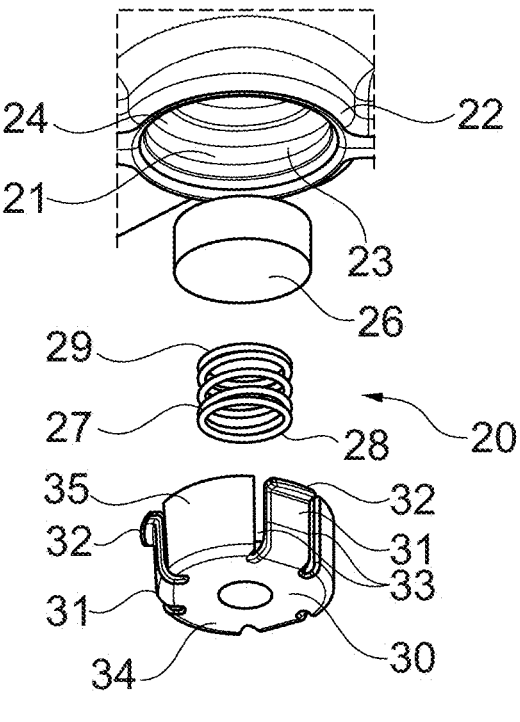
FIG. 4 is a partially exploded detail view of the brake signal transmitter.
Figures 5, 6, 7, 8:
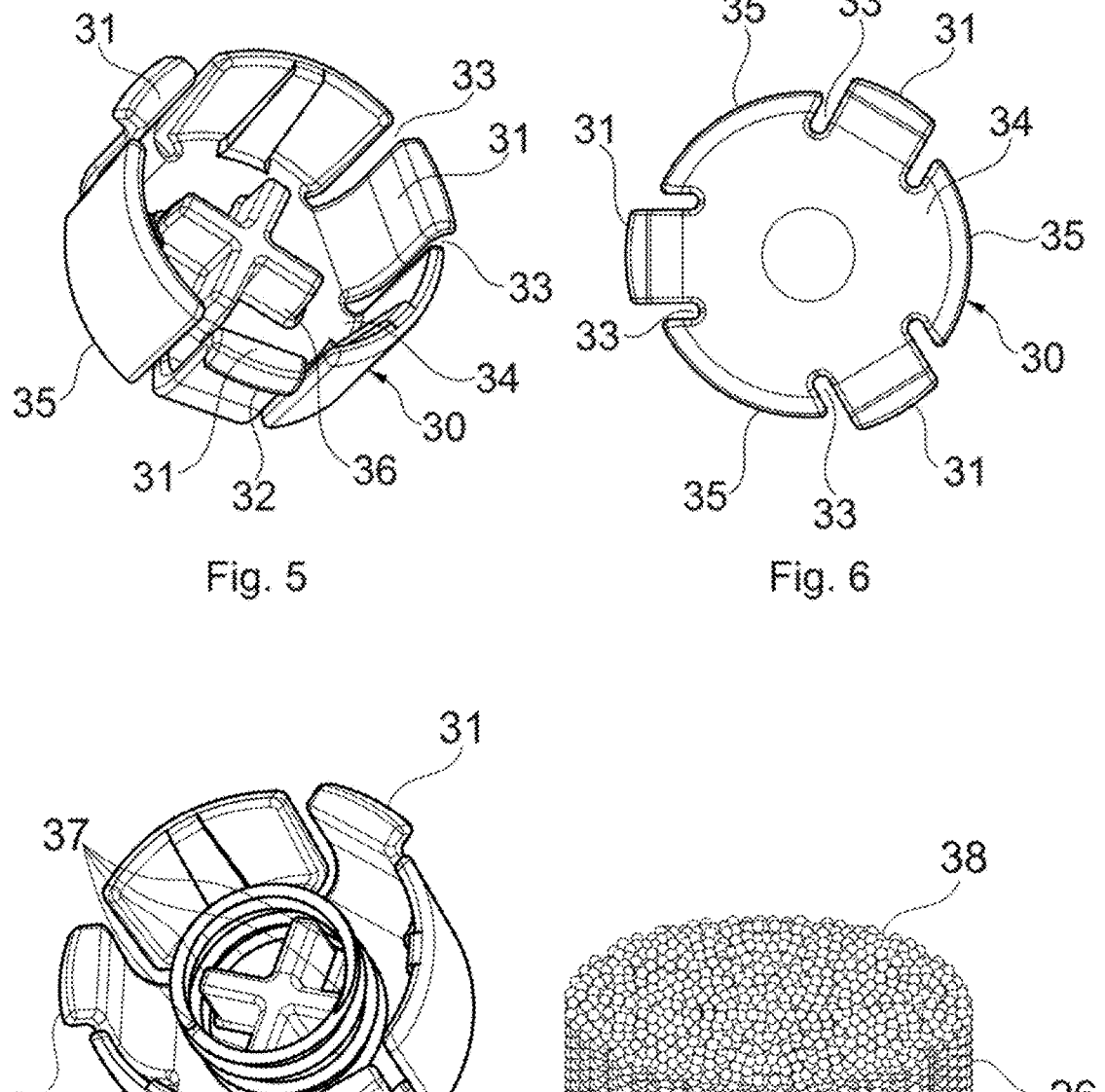
FIG. 5 is a perspective view of a cap of the brake signal transmitter.
FIG. 6 is a plan view of the cap.
FIG. 7 is a perspective view of the cap with a bias member arranged thereon.
FIG. 8 is a perspective view of a filter of a foreign matter ingress-reducing arrangement.

A configuration of the liquid drainage system 20 of the brake signal transmitter 10 will be explained in more detail with reference to FIGS. 3 to 12. FIG. 3 is a partially exploded perspective view of the brake signal transmitter 10. FIG. 4 is a partially exploded detail view of the brake signal transmitter 10. FIG. 5 is a perspective view of the cap 30 of the brake signal transmitter 10. FIG. 6 is a plan view of the cap 30.

FIG. 7 is a perspective view of the cap 30 with a bias member 27 arranged thereon. FIG. 8 is a perspective view of a filter 26 of a foreign matter ingress-reducing arrangement of the liquid drainage system 20.

The liquid drainage system 20 includes the cap 30, the opening 21 of the housing 11, and may optionally include additional components such as the bias member 27 which may be implemented by a compression spring, and the filter 26 that further reduce the risk of ingress of liquid and/or dirt (i.e., particulate matter) into the housing 11. The opening 21 may be circular, without being limited thereto. The housing 11 includes a flange 22 projecting outwardly from the lower portion 15. The flange 22 facilitates assembly of the cap 30, provides protection for the cap 30, and reduces the effective area through which liquid and/or dirt could potentially enter into the housing 11 against the gravity force.

The cap 30 includes one or several snap fingers 31 that form as resiliently deformable cover portions. Each of the snap fingers 31 has an engagement structure 32 at its end. The snap finger(s) 31 allow the cap 30 to be secured on the housing 11 by way of a snap fit. A mating retaining recess 23 into which the engagement projections 32 can snap is provided in an inner wall of the flange 22. The retaining recess 23 can be a circumferential recess that extends circumferentially along an entire inner circumference of the flange 22. The snap finger(s) 31 may be resiliently deformable so as to bend towards a center axis of the cap 30 when the cap 30 is inserted into the socket defined by the flange 22. The snap finger(s) 31 may be dimensioned and biased so as to snap into the retaining recess 23 upon insertion of the cap 30 into the housing socket surrounded by the flange 22. On both circumferential sides, each snap finger 31 may be spaced from an adjacent cylindrical segment 35 of the cap 30 by a gap 33. The gaps 33 may extend from the free ends of the fingers 31 to an end face 34 of the cap. The end face 34 of the cap may be dimensioned to cover all or at least most of the opening 21 in the housing as seen in a plan view in a viewing direction perpendicular the end face 34.

The bias member 27, which may be implemented as a coil spring 27, may bias the cap 30 such that the engagement projections 32 are forced against a rim of the circumferential recess 23. The risk of unintentional deflection of the snap finger(s) 31 and, thus, of unintentional dislodgment of the cap 30 is thereby mitigated.

The coil spring 27 may be a compression spring. The coil spring 27 may be made of steel. Other implementations that provide shape memory may be used. The coil spring 27 may be a compression spring configured to provide the forces that reduce the risk of unintentional dislodgment of the cap 30 and/or the filter 26.

The snap finger(s) 31 and preferably all of the cap 30 may be made of a plastic material. This allows weight to be kept low. Moreover, the force exerted by the snap finger(s) 31 of plastic material onto the flange 22 are so low that the flange 22 may be formed with a small thickness as compared to other fastening techniques, such as crimping. This also contributes to keeping the weight low. The plastic material may be a polyamide, such as a glass fiber reinforced polyamide such as PA6-GF30. By using a fiber reinforced polymeric material, such as polyamide, a desired strength is attained for the cap while keeping its weight low.

While a snap-fit coupling of the cap 30 and the housing 11 has been explained above, other configurations may be used in accordance with the present disclosure for securing the cap 30 to the housing 11. For illustration, the cap 30 and the housing 11 may be configured such that the cap 30 is secured to the housing 11 by way of a press-fit or push-in connection. The cap 30 is respectively arranged so as to overlap the opening 21 to reduce the likelihood of foreign matter ingress into the housing 11 through the opening 21.

The liquid drainage system 20 includes the filter 26. The filter 26 may be or may include a sintered body. The filter 26 may include spheres and/or ellipsoids in a closed packing to further mitigate the risk of ingress of foreign matter (e.g., particulate matter such as dirt and/or liquid such as spray water) into the housing against the gravity force. The filter 26 may be or may include a bronze sintered body, without being limited thereto. Such a filter configuration provides a labyrinth-type liquid flow path and thereby reduces the risk of liquid and/or dirt entering the housing in a direction opposite to the gravity direction.

The spring 27 may be arranged in such a way that it biases the cap 30 relative to the filter 26. Thereby, the engagement projections 32 are pushed against a rim of the circumferential recess 23, reducing the risk of unintentional dislodgment of the gap. Further, the filter 26 is pushed against an abutment surface 24 of the housing surrounding the opening 21 in a ring-shaped manner. Forcing the filter 26 against the abutment surface 24 by way of the spring 27 reduces the risk of the filter 26 being dislodged relative to the abutment surface 24 during use. Tight abutment of the filter 26 on the abutment surface 24 reduces the formation of additional gaps through which water or dirt could enter the housing 11. In the assembled brake signal transmitter 10, a first spring end ring 28 of the spring acting as bias member abuts on the cap 30, and a second spring end ring 29 abuts on the filter 26.

The cap 30 may include a spring positioning structure 36. The spring positioning structure 36 may include a plurality of arms having ends 37 dimensioned to fit into an end ring of the spring 27. Other positioning structures may be used to position the spring 27 centrally relative to the cap 30 and the filter 26.

FIG. 8 shows a perspective view of the filter 26 when the filter is formed as a sintered body. The filter 26 may have a generally cylindrical outer envelope. The filter 26 may have a first filter end face 38 on which the second spring end ring 29 abuts. The filter 26 may have a second filter end face 39 that abuts on the abutment surface 24 of the housing.

Figures 9, 10, 11, 12:
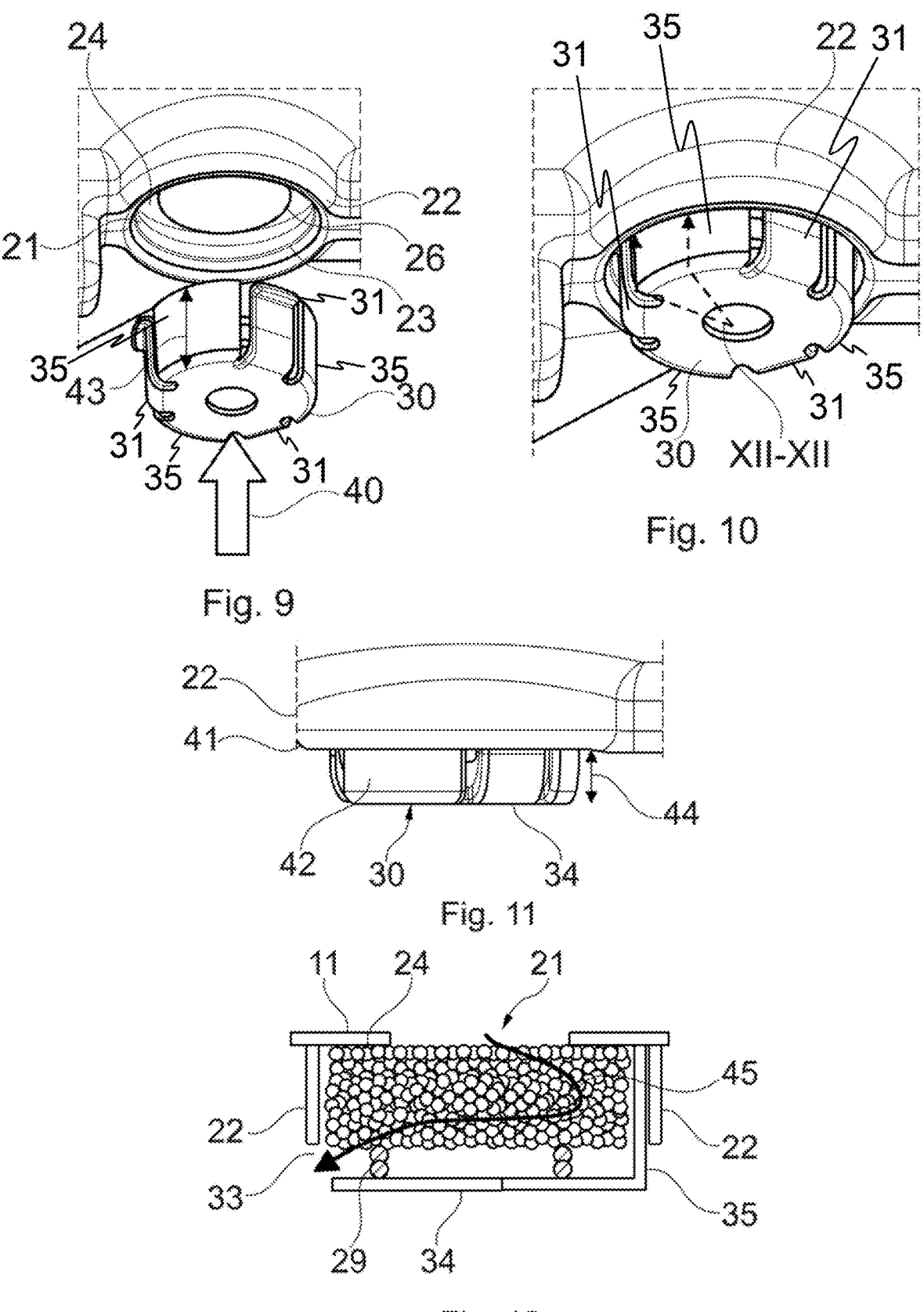
FIG. 9 is a perspective detail view illustrating assembly of the cap to a housing of the brake signal transmitter.
FIG. 10 is a perspective detail view illustrating the cap assembled to the housing of the brake signal transmitter.
FIG. 11 is a side view illustrating the cap assembled to the housing of the brake signal transmitter.
FIG. 12 is a cross-sectional view along line XII-XII in FIG. 10.

FIG. 9 and FIG. 10 are detail views illustrating assembly of the cap 30 to the housing 11. The filter 26 is received, at least in part, within a skirt portion of the cap 30 formed by the resilient fingers 31 and the cylindrical surface segments 35. With at least the resilient fingers 31 of the cap 30 being made of a plastic material (such as a glass fiber reinforced polymeric material, e.g., a glass fiber reinforced polyamide), an assembly force 40 is low.

FIG. 11 shows a detail view of the brake signal transmitter 10 when the cap 30 is assembled to the housing 11. When assembled, only a portion 42 of the cap 30 projects outwardly from an outer flange end plane 41 of the flange 22. A height 44 of the projecting cap portion 42, measured between the cap end face 34 and the flange end plane 41 at the free end of the flange 22, is less than a total height 43 of the cap, measured between the end face 34 and the free ends of the cylindrical portions 35. Thereby, the exposed parts of the gaps 33 that project outwardly beyond the flange end plane 41 make it even more challenging for liquid and/or dirt to enter the housing against the action of gravity. In some implementations, a ratio of the height 44 to the total height 43 may be 0.8 or less, 0.7 or less, 0.6 or less, or 0.5 or less.

FIG. 12 is a cross-sectional view of the liquid drainage system 20 when the cap 30 is assembled to the housing. The flange 22, the filter 26, the cylindrical segments 35 of the cap 30, and the resilient fingers 31 of the cap 30 provide a tortuous path 45 through which water can exit the housing 11 in a gravity-driven manner. The liquid (in particular water) passes through and out of the cap 30 at the gap 33 which forms an aperture for liquid egress. At the same time, a labyrinth-type seal is provided that makes it unlikely for liquid (such as spray water) and/or dirt (i.e., particulate matter) to enter the housing through the liquid discharge system 20.

Figure 13:
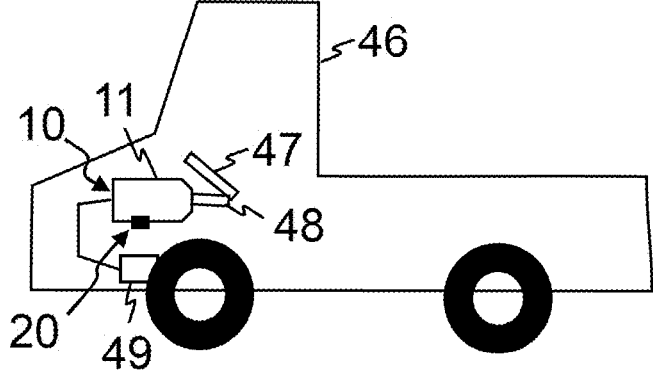
FIG. 13 is a schematic view of a commercial vehicle having the brake signal transmitter.

FIG. 13 is a schematic view of a vehicle 46. The vehicle 46 may be a commercial vehicle, such as a towing vehicle, a truck, a lorry, or a bus. The brake signal transmitter 10 may include an actuation device, which may be provided by a linkage 48 and/or brake pedal 47. The actuation device provides an input to the brake signal transmitter 10. In response to the input, the brake signal transmitter generates a fluidic and/or electric signal that causes a brake 49 to be actuated in accordance with a magnitude by which the actuation device has been displaced by a driver.

As schematically shown in FIG. 13, the brake signal transmitter 10 is arranged in the vehicle in such a manner that its axis 16 is transverse to the gravitational force direction when the vehicle 46 is on a horizontal surface.

As schematically shown in FIG. 13, the housing 11 of the brake signal transmitter 10 is oriented such that the opening 21 of the liquid drainage system 20 faces downward, relative to the gravitational force direction, when the vehicle 46 is on a horizontal surface.

Figure 14:
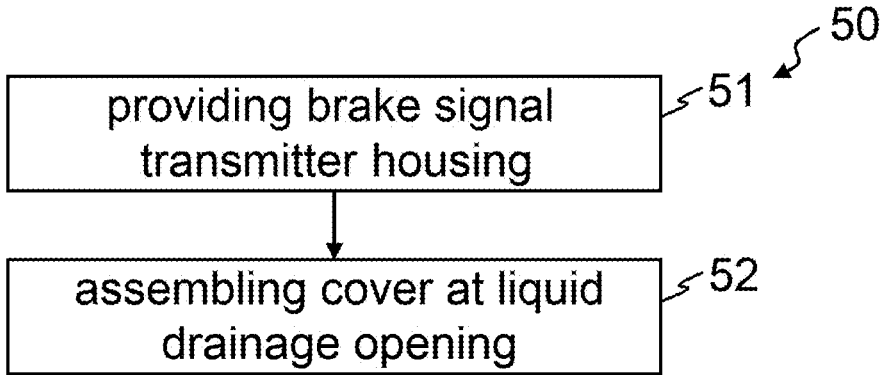
FIG. 14 is a flow chart of a method of assembling the brake signal transmitter.

FIG. 14 is a flow chart of a method 50 of assembling the brake signal transmitter. At process block 51, the brake signal transmitter housing 11 is provided. At process block 52, the cover including at least the cap 30 is assembled so as to overlap the opening 21. The assembly step may include arranging the filter 26 in a socket of the housing 11 delimited by the flange 22 and arranging the spring 27 (which is an example of a bias member) between the cap 30 and the filter 26.

While embodiments have been described with reference to the drawings, modifications and alterations may be implemented in other embodiments.

For illustration, while embodiments have been described in which a liquid drainage system includes a filter as an element separate from and interposed between the cap and the housing, the filter may be formed integrally with the housing or the cap.

For further illustration, while a cover has been described which is configured as a cap having a circular cap end face and a skirt portion extending from a circumference of the circular cap end face, the cover may have other shapes configured to extend over or along the opening of the housing.

For further illustration, while a cover engageable or engaged with the housing by way of a snap-fit connection has been described, other engagement techniques can be used. In particular, other techniques which allow the cover (e.g., the cap) to be directly engaged with and secured on the housing without requiring a fastening element different from the cap and the housing afford ease of assembly. Such techniques include, without limitation, a press-fit or push-in connection.

For further illustration, while a brake signal transmitter has been described which includes an actuation device, such as a brake pedal or linkage, the brake signal transmitter may have other structural configurations useful for generating and providing an output (such as a fluidic and/or electric) responsive to an input (such as a mechanical movement of a device actuable by a driver).

For further illustration, while a brake signal transmitter has been described which is configured for gravity-driven liquid drainage when installed in a horizontal orientation, the brake signal transmitter may also be operative to provide gravity-driven liquid drainage when installed in a vertical orientation.

Various effects and advantages are attained by embodiments of the present disclosure. For illustration, embodiments provide a brake signal transmitter having a mechanism for liquid drainage while reducing or eliminating the risk of ingress of liquid and/or dirt into the housing. The brake signal transmitter according to at least some embodiments allows liquid to be drained from the housing of the brake signal transmitter without requiring the brake signal transmitter to be necessarily mounted vertically. The brake signal transmitter according to at least some embodiments allows liquid to be drained from the housing while providing greater flexibility in mounting the brake signal transmitter, such as by enabling gravity-driven liquid drainage when the brake signal transmitter is mounted horizontally. The brake signal transmitter according to at least some embodiments is implemented using light-weight components which are designed in such a manner that a flange for receiving the cover does not need to be formed with a large thickness, which would add to the weight.

LIST OF REFERENCE NUMERALS (PART OF THE DESCRIPTION)

10 brake signal transmitter
11 housing
12 first axial housing end
13 second axial housing end
14 circumferential housing wall
15 lower portion of circumferential housing wall
16 housing axis
17 brake signal transmitter main valve
18 brake signal transmitter main coil spring
19 gravitational force direction
20 liquid drainage system
21 opening
22 flange
23 retaining recess
24 abutment surface
25 water flow path
26 filter
27 spring
28 first spring end ring
29 second spring end ring
30 cap
31 resilient portion
32 engagement projection
33 gap
34 cap end face
35 cap cylindrical segment
36 spring positioning structure
37 ends of spring positioning structure
38 first filter end face
39 second filter end face
40 assembly force
41 flange end plane
42 projecting cap portion
43 cap height
44 projecting cap height
45 tortuous path
46 vehicle
47 brake pedal
48 linkage
49 brake
50 method
51 process block
52 process block

What is claimed is:
1. A brake signal transmitter (10), comprising:
a housing (11); and
a liquid drainage system (20), comprising:
    an opening (21) in the housing (11); and
    a cover (30) configured to extend over or along the opening (21);
wherein the cover (30) includes at least one aperture (33) configured to allow a liquid to be drained through the cover (30);
wherein the cover (30) includes a plastic material;

wherein the cover (30) includes an engagement structure (31, 32) that engages with the housing (11), wherein the engagement structure (31, 32) includes or is made of the plastic material;
wherein the engagement structure (31, 32) includes at least one resiliently deformable cover portion (31), wherein the at least one resiliently deformable cover portion (31) provides a snap-fit engagement with the housing (20); and
wherein the at least one resiliently deformable cover portion (31) comprise at least one resilient finger (31), and the at least one aperture (33) includes gaps (33) on opposite sides of the at least one resilient finger (31).

2. The brake signal transmitter (10) of claim 1, wherein the brake signal transmitter (10) includes a foreign matter ingress-reducing arrangement (24, 26, 37) having a filter (26) biased toward an abutment surface (24) surrounding the opening (21).

3. The brake signal transmitter (10) of claim 1, wherein the housing (11) includes a housing socket (22) at the opening (21).

4. The brake signal transmitter (10) of claim 3, wherein the cover (30) is inserted into the housing socket (22).

5. The brake signal transmitter (10) of claim 1, wherein the foreign matter ingress-reducing arrangement (24, 26, 37) is configured to reduce or eliminate foreign matter ingress through the opening (21) into the housing (11).

6. The brake signal transmitter (10) of claim 5, wherein the foreign matter ingress-reducing arrangement (24, 26, 37) includes a tortuous path (45), wherein the cover (30) delimits at least a portion of the tortuous path (45).

7. The brake signal transmitter (10) of claim 1, wherein the cover (30) is a cap (30), wherein the cap (30) includes a skirt portion (31, 35) that receives at least a portion of the filter (26) therein, wherein the skirt portion (31, 35) extends from a cap end portion (34).

8. The brake signal transmitter (10) of claim 1, further comprising:
an actuating device (47) configured to enable actuation of the brake signal transmitter (10) by a driver of a vehicle, and
a pressure-producing device (17, 18) configured to generate a braking pressure in response to the actuation, the pressure-producing device (17, 18) being arranged in the housing (11).

9. The brake signal transmitter (10) of claim 1, wherein the housing (11) includes a first a first axial housing end, a second axial housing end, and a circumferential housing wall extending between the first axial housing end and the second axial housing end, wherein the opening is provided in the circumferential housing wall.

10. The brake signal transmitter (10) of claim 9, wherein the opening is spaced from both the first axial housing end and the second axial housing end, wherein liquid drainage through the opening is facilitated at an intermediate location between the first and second axial housing ends.

11. The brake signal transmitter (10) of claim 10, wherein an inner diameter of the circumferential housing wall varies in a direction from the first axial housing end to the second axial housing end, wherein the opening is provided in a portion of the circumferential housing wall where the inner diameter is maximum, wherein gravity-driven liquid drainage is facilitated when the brake signal transmitter is mounted horizontally.

12. A braking system (10, 47, 48, 49), comprising the brake signal transmitter (10) of claim 1.

13. A vehicle (46), comprising the braking system (10, 47, 48, 49) of claim 12, wherein the opening (21) of the housing (11) is arranged on a downward side of the housing (11) relative to a gravitational force direction (19) when the vehicle (46) is on a horizontal surface.

14. The brake signal transmitter (10) of claim 1, wherein the brake signal transmitter includes a foreign matter ingress-reducing arrangement that includes a tortuous path, wherein the cover (30) delimits at least a portion of the tortuous path;

wherein the tortuous path extends from the opening (21) in the housing (11) to the at least one aperture (33) in the cover (30);

wherein the cover (30) defines a labyrinth-type seal that reduces the risk of foreign matter ingress through the opening (21).

15. The brake signal transmitter of claim 14, wherein liquid drains through the tortuous path in a gravity-driven manner, wherein the liquid passes through and out of the cover (30) at the at least one aperture (33), wherein the labyrinth-type seal blocks liquid and/or particulate matter from entering the housing through the liquid discharge system.

16. A brake signal transmitter (10), comprising:

a housing (11); and a liquid drainage system (20), comprising:

an opening (21) in the housing (11); and a cover (30) configured to extend over or along the opening (21);

wherein the cover (30) includes at least one aperture (33) configured to allow a liquid to be drained through the cover (30);

wherein the brake signal transmitter (10) includes a foreign matter ingress-reducing arrangement (24, 26, 37) configured to reduce or eliminate foreign matter ingress through the opening (21) into the housing (11)

wherein the foreign matter ingress-reducing arrangement (24, 26, 37) includes a tortuous path (45), wherein the cover (30) delimits at least a portion of the tortuous path (45)

wherein the foreign matter ingress-reducing arrangement (24, 26, 37) includes a filter (26)

wherein the cover (30) is a cap (30), wherein the cap (30) includes a skirt portion (31, 35) that receives at least a portion of the filter (26) therein, wherein the skirt portion (31, 35) extends from a cap end portion (34); and wherein the foreign matter ingress-reducing arrangement (24, 26, 37) includes a resiliently deformable bias member (37) that biases the filter (26) and the cap end portion (34) away from each other, wherein the resiliently deformable bias member (37) is interposed between the filter (26) and the cap end portion (34) and biases the filter (26) toward an abutment surface (24) surrounding the opening (21).

17. The brake signal transmitter (10) of claim 16, wherein the cover (30) includes a plastic material.

18. The brake signal transmitter (10) of claim 17, wherein the cover (30) includes an engagement structure (31, 32) that engages with the housing (11), wherein the engagement structure (31, 32) includes or is made of the plastic material.

19. The brake signal transmitter (10) of claim 18, wherein the engagement structure (31, 32) includes at least one resiliently deformable cover portion (31), wherein the at least one resiliently deformable cover portion (31) provides a snap-fit engagement with the housing (20).

20. A brake signal transmitter (10), comprising:

a housing (11); and a liquid drainage system (20), comprising:

an opening (21) in the housing (11); and a cover (30) configured to extend over or along the opening (21);

wherein the cover (30) includes at least one aperture (33) configured to allow a liquid to be drained through the cover (30);

wherein the brake signal transmitter (10) includes a foreign matter ingress-reducing arrangement (24, 26, 37) having a filter (26) biased toward an abutment surface (24) surrounding the opening (21);

wherein the filter (26) is integrally formed as one piece with the housing (11) or the cover (30).

* * * * *